(12) United States Patent
Yu et al.

(10) Patent No.: US 7,987,316 B2
(45) Date of Patent: Jul. 26, 2011

(54) PROGRAMMING DEVICE FOR NON-VOLATILE MEMORY AND PROGRAMMING METHOD THEREOF

(75) Inventors: Hsiang-Hsiung Yu, Miaoli (TW); Yu-An Chang, Miaoli (TW)

(73) Assignee: Phison Electronics Corp., Miaoli (TW)

( * ) Notice: Subject to any disclaimer, the term of this patent is extended or adjusted under 35 U.S.C. 154(b) by 680 days.

(21) Appl. No.: 12/068,587

(22) Filed: Feb. 8, 2008

(65) Prior Publication Data

US 2009/0204745 A1 Aug. 13, 2009

(51) Int. Cl.
*G06F 12/00* (2006.01)

(52) U.S. Cl. ............... 711/103; 711/100; 711/E12.001; 714/6; 365/185.33; 365/230.06

(58) Field of Classification Search ................ 711/100, 711/103, E12.001; 714/6; 365/185.33, 230.06
See application file for complete search history.

(56) References Cited

U.S. PATENT DOCUMENTS

| 2008/0109702 A1* | 5/2008 | Brandman | 714/763 |
| 2008/0109703 A1* | 5/2008 | Brandman | 714/763 |

* cited by examiner

*Primary Examiner* — Jasmine Song
(74) *Attorney, Agent, or Firm* — Bacon & Thomas, PLLC (57) ABSTRACT

The invention presents a programming method for a non-volatile memory with a bit signal to be programmed unidirectionally. The method includes the steps of a) providing first data each having a first number of sequential bits of first status in a data page in a non-volatile memory, b) decoding the first number of sequential bits of the first status in the first data into a second number of sequential bits of second status, and c) programming second data in a portion of the data page where the first status has been decoded to the second status.

21 Claims, 9 Drawing Sheets

PROGRAMMING DEVICE FOR NON-VOLATILE MEMORY AND PROGRAMMING METHOD THEREOF

TECHNOLOGY FIELD

The present invention relates generally to a non-volatile memory and a programming method thereof. More specifically, the present invention relates to a programming device for an electrically erasable programmable read-only memory (EEPROM) or flash memory, and to a programming method of the non-volatile memory for programming bit signals unidirectionally.

BACKGROUND

Non-volatile memories have attained wide utilization due to an ability to retain data within a device, particularly in the form of EEPROM and flash memory. Flash memory embedded and in the form of a removable card is suitable for the mobile and handheld environment because of its small size, low power consumption, high speed and high reliability features. Non-volatile memories are able to provide these advantages, but there are still problems, such as incorrect data transmitted, waste of memory spaces occurred during data recording and limited erasing times.

Hence, it needs to provide a programming method for non-volatile memories programming bit signals unidirectionally, where an error correction code (ECC) is introduced into the present invention, thereby providing the capability of error-correction coding for preventing bit errors of storage memories, decreasing the utilization ratio of new pages to program updated data, and saving spaces of entire memory.

SUMMARY

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a programming method of non-volatile memory for programming bit signals unidirectionally includes the steps of: a) providing first data each comprising a first number of sequential bits of first status in a data page in a non-volatile memory; b) decoding the first number of sequential bits of the first status in the first data into a second number of sequential bits of second status; and c) programming third data each having N bits into second data with error correction code (ECC) in a portion of the data page where the first status has been decoded to the second status. The second data each has (N+K) bits, and any two different data among the second data have a variance of M bits, where N is a positive integer, K and M are both integers not less than 3, and M is less than (K+N). If any of the third data has N sequential bits of "0", the corresponding one of the second data has at least (N+3) sequential bits of "1".

In accordance with another aspect of the present invention, a controller for programming bit signals unidirectionally in a non-volatile memory partitioned into a plurality of data pages includes a decoding module and programming module. The decoding module decodes first data in a data page in the non-volatile memory. When the first data each comprises a first number of sequential bits of first status, the first number of sequential bits of the first status are decoded into a second number sequential bits of second status to indicate a portion of the data page for programming second data. The programming module encodes third data each having N bits into the second data of (N+K) bits. Any two different data among the second data have a variance of M bits, where N is a positive integer, K and M are both integers not less than 3, and M is less than (K+N). If any of the third data has N sequential bits of "0", the corresponding one of the second data has at least (N+3) sequential bits of "1".

Further in accordance with the other aspect of the present invention, a non-volatile memory storage system for programming bit signals unidirectionally includes a memory module, a decoding module and a programming module. The memory module is partitioned into a plurality of data pages for storing data. The decoding module decodes first data in a data page in the non-volatile memory. When the first data each comprises a first number of sequential bits of first status, the first number of sequential bits of the first status are decoded into a second number of sequential bits of second status to indicate a portion of the data page for programming second data including error correction code (ECC). The programming module encodes third data into the second data. The third data each has N bits and is encoded into the second data of (N+K) bits, and any two different data among the second data have a variance of M bits, where N is a positive integer, K and M are both integers not less than 3, and M is less than (K+N). If any of the third data has N sequential bits of "0", the corresponding one of the second data has at least (N+3) sequential bits of "1".

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF THE PREFERRED EMBODIMENTS

Reference will now be made in detail to the present preferred embodiments of the invention, examples of which are illustrated in the accompanying drawings. Wherever possible, the same or like reference numbers are used in the drawings and the description to refer to the same or like parts.

Figure 1:
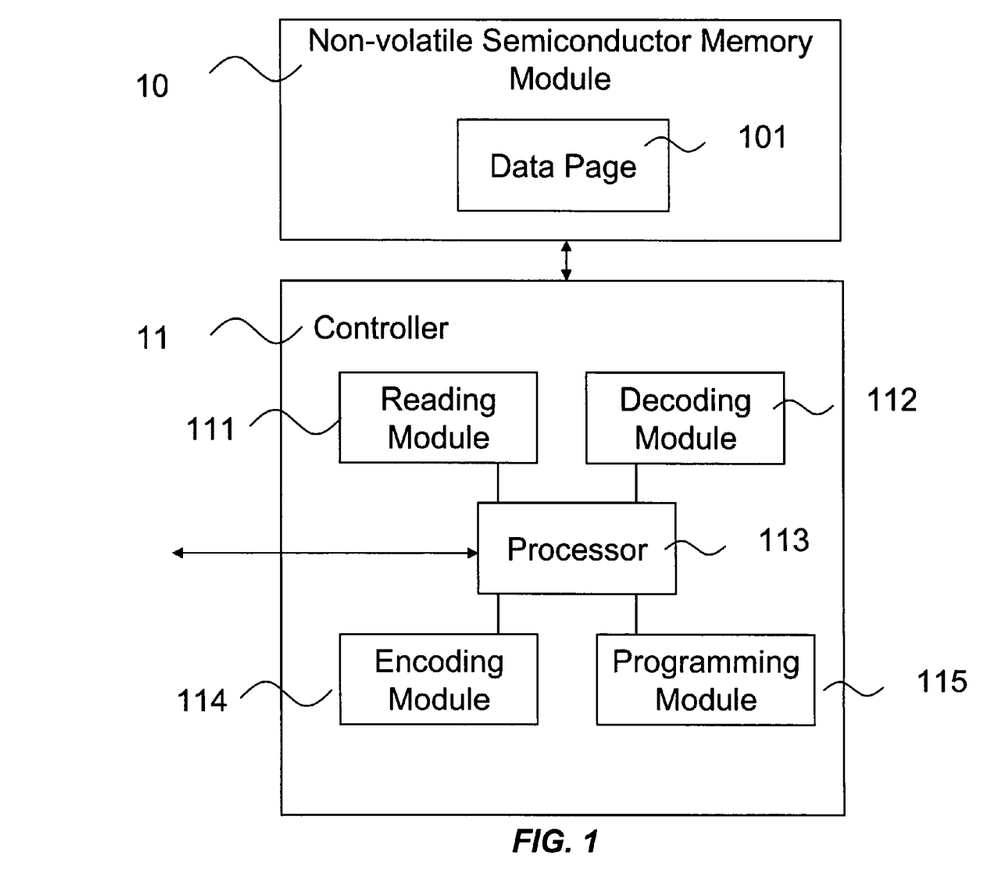
FIG. 1 is a schematic diagram of a controller for a non-volatile memory module according to a first embodiment of the present invention.
Figure 2A:
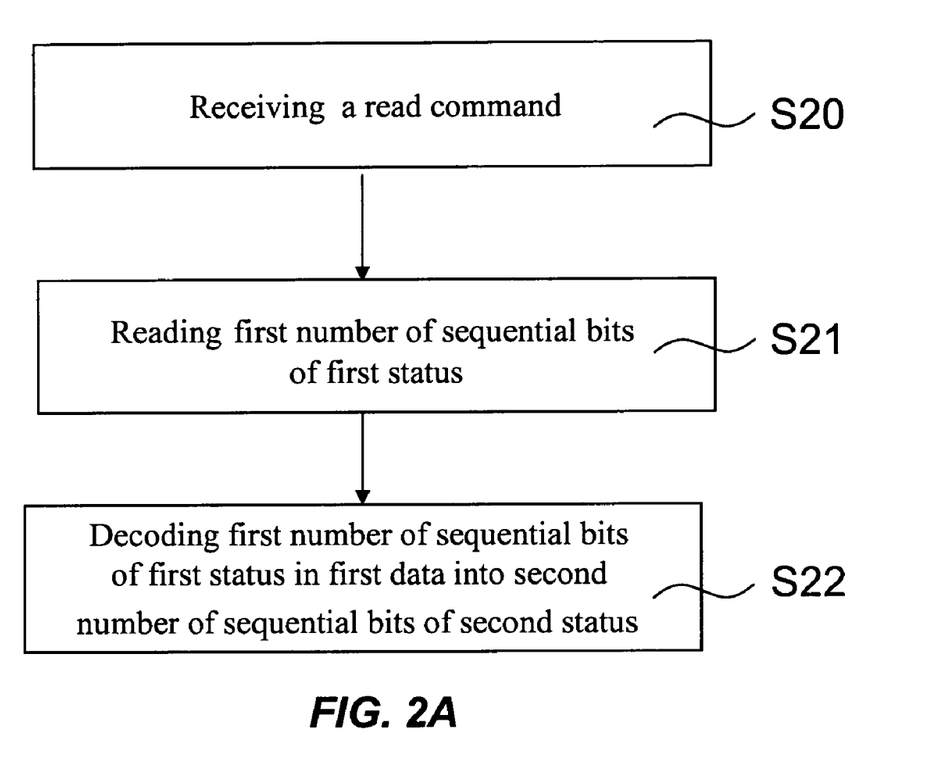
FIGS. 2A-2B illustrate a programming method according to the first embodiment of the present invention.
Figure 2B:
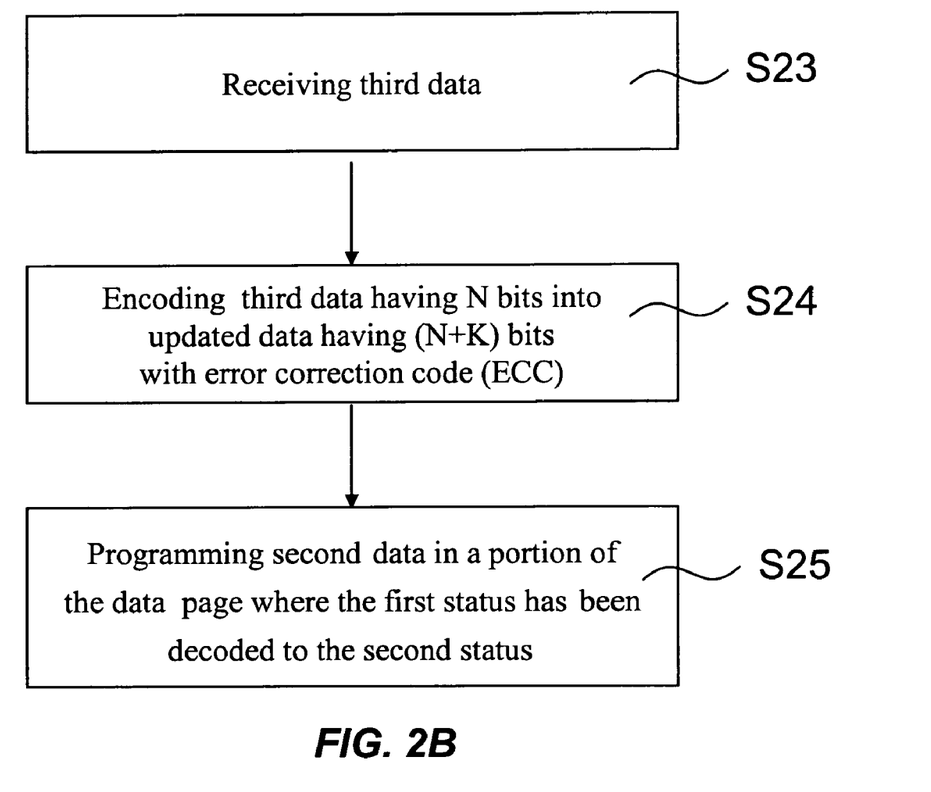

Please refer to FIG. 1, FIG. 2A and FIG. 2B which illustrate a first preferred embodiment according to the invention. This embodiment provides a controller 11 and a non-volatile semiconductor memory module 10. The controller 11 comprises a processor 113, a decoding module 112, an encoding module 114, a reading module 111, and a programming module 115. The processor 113 is used for controlling other units of the controller 11. The decoding module 112 electrically connects with the processor 113 and is used for decoding data. The encoding module 114 electrically connects with the processor 113 and is used for encoding data. The reading module 111 electrically connects with the processor 113 and is used for reading data.

The programming module 115 electrically connects with the processor 113 and is used for programming data. The non-volatile semiconductor memory module 10 is used for storing data. In the present embodiment, the non-volatile semiconductor memory module 10 is a flash memory which may be a single level cell (SLC) flash memory or a multi-level cell (MLC) flash memory.

In the present embodiment, the controller 11 decodes a first number of sequential bits of a first status in first data into a second number of sequential bits of a second status from the data page 101 to a host (not shown), and encodes third data into second data and saves the second data into the data page 101 which has been programmed in the non-volatile memory module 10. The second data are encoded with error correction code (ECC) and able to be recorded in the data page 101 rather than a new data page in order to save memory spaces. Hereinafter, technical features and technical functions to be achieved by the present invention are described in detail for those skilled in the art.

At Steps S20 and S21 of FIG. 2A, when the controller 11 sends a read command for constructing/updating FAT or other purposes to the reading module 111. The reading module 111 reads data in the data page 101. The decoding module 112 could decode the first number of sequential bits of the first status. Herein, the first status of the bit is logic "1" and the decoding module 112 could decode the first data from the end of last writing portion of the data page 101 for this embodiment. However, alternatively, the decoding module 112 could decode data from the beginning of the data page 101. The first number of sequential bits of the first status is further decoded to the second number of sequential bits of the second status by the decoding module 112 in the controller 11, as shown in Step S22 of FIG. 2A. The decoding module 112 decodes 1 byte "0xff" into 2 bits "00". In other words, the decoding module 112 decodes 4 bytes of "0xff" in the sequence of bit "1" of the first data into a byte of "0x00". Herein, the second status is logic "0". The first number and second number are 8 and 2 respectively. Therefore, when data in the data page 101 is 4 bytes "0xff", it will be converted to 1 byte "0x00". These data will be provided to the host. According to the rule of FAT in the host, a cluster could be programmed when data in this cluster consists of "0". It means that the controller 11 will not erase a block again in the non-volatile semiconductor memory module 10 for programming new data if a portion of the data page where the first status has been decoded to the second status is big enough.

Of course, alternatively, a memory module could be programming a bit signal unidirectionally from "0" to "1" merely. The first status can be logic "0" and the second status can be logic "1" as desired. The location of the first status can be any place in the first data. Moreover, for different encoding algorithms, the first number and the second number can be any integers.

In FIG. 2B at Step S23, for third data with N bits to be written to the non-volatile memory module 10, the processor 113 will receive the third data from the host and send the third data to the encoding module 114. The encoding module 114 encodes the third data into the second data with (N+K) bits and sends the second data back to the processor 113. Any two different data among the second data have a variance of M bits. N herein is defined to be a positive integer, K and M are both integers not less than 3, and M is less than (K+N). If any of the third data has N sequential bits of "0", the corresponding one of the second data has at least (N+3) sequential bits of "1". The error correction code (ECC) is provided to the third data at Step S24 of FIG. 2B.

A 2-bit third data is encoded into 8-bit second data in this embodiment. According to the above description, N=2 and K=6. Furthermore, each two 8-bit second data, which are encoded from two of the 2-bit third data with different values, should have a variance of M bits. M is set to be 3. On the other hand, in this embodiment, this programming method is introduced to the memory limited to programming a bit signal unidirectionally from "1" to "0" merely. 2-bit third data "11" is encoded as 8-bit second data "111 01000". The preceding 3 bits of the 8-bit second data are fixed and won't play any part in coding process. Accordingly, 2-bit third data "10" is encoded as a 8-bit second data "111 00101", 2-bit third data "01" is encoded as a 8-bit second data "111 10010", and 2-bit third data "00" is encoded as a 8-bit second data "111 11111". After the second data is generated from the encoding module 114, the processor 113 will send the second data to a programming module 115. The bit signal can also be programmed unidirectionally from "0" to "1" merely, and the description thereof is omitted for brevity.

At Step S25 of FIG. 2B, the programming module 115 will program the second data into the location of the data page where the first byte of "0x00" is decoded from the first data by the decoding module 112.

If the third data need to be loaded from the data page 101 in the non-volatile memory module 10, the reading module 111 will find out and read the recorded second data. The decoding module 112 will decode the second data and obtain the third data.

However, during Step S25, some bits might be incorrectly recorded. For example, byte "111 01000" is recorded as byte "111 01001". Since ECC is provided, the correct third data can be obtained by the programming module 115. In this embodiment, the programming module 115 uses Hamming code as shown in Table 1 below. The two bits which the second data with last 5 bits correspond to are chosen as the decoded third data, as shown in Table 1.

TABLE 1

| 000 00 ⇒ 11 | 000 01 ⇒ 10 | 000 10 ⇒ 01 | 000 11 ⇒ 10 |
|---|---|---|---|
| 001 00 ⇒ 10 | 001 01 ⇒ 10 | 001 10 ⇒ 10 | 001 11 ⇒ 10 |
| 010 00 ⇒ 11 | 010 01 ⇒ 11 | 010 10 ⇒ 11 | 010 11 ⇒ 11 |
| 011 00 ⇒ 11 | 011 01 ⇒ 10 | 011 10 ⇒ 11 | 011 11 ⇒ 00 |
| 100 00 ⇒ 10 | 100 01 ⇒ 01 | 100 10 ⇒ 01 | 100 11 ⇒ 01 |
| 101 00 ⇒ 00 | 101 01 ⇒ 10 | 101 10 ⇒ 01 | 101 11 ⇒ 00 |
| 110 00 ⇒ 11 | 110 01 ⇒ 00 | 110 10 ⇒ 01 | 110 11 ⇒ 00 |
| 111 00 ⇒ 11 | 111 01 ⇒ 00 | 111 10 ⇒ 00 | 111 11 ⇒ 00 |

However, there are many ways to provide ECC function. This invention is not limited to use Hamming code.

Figure 3A:
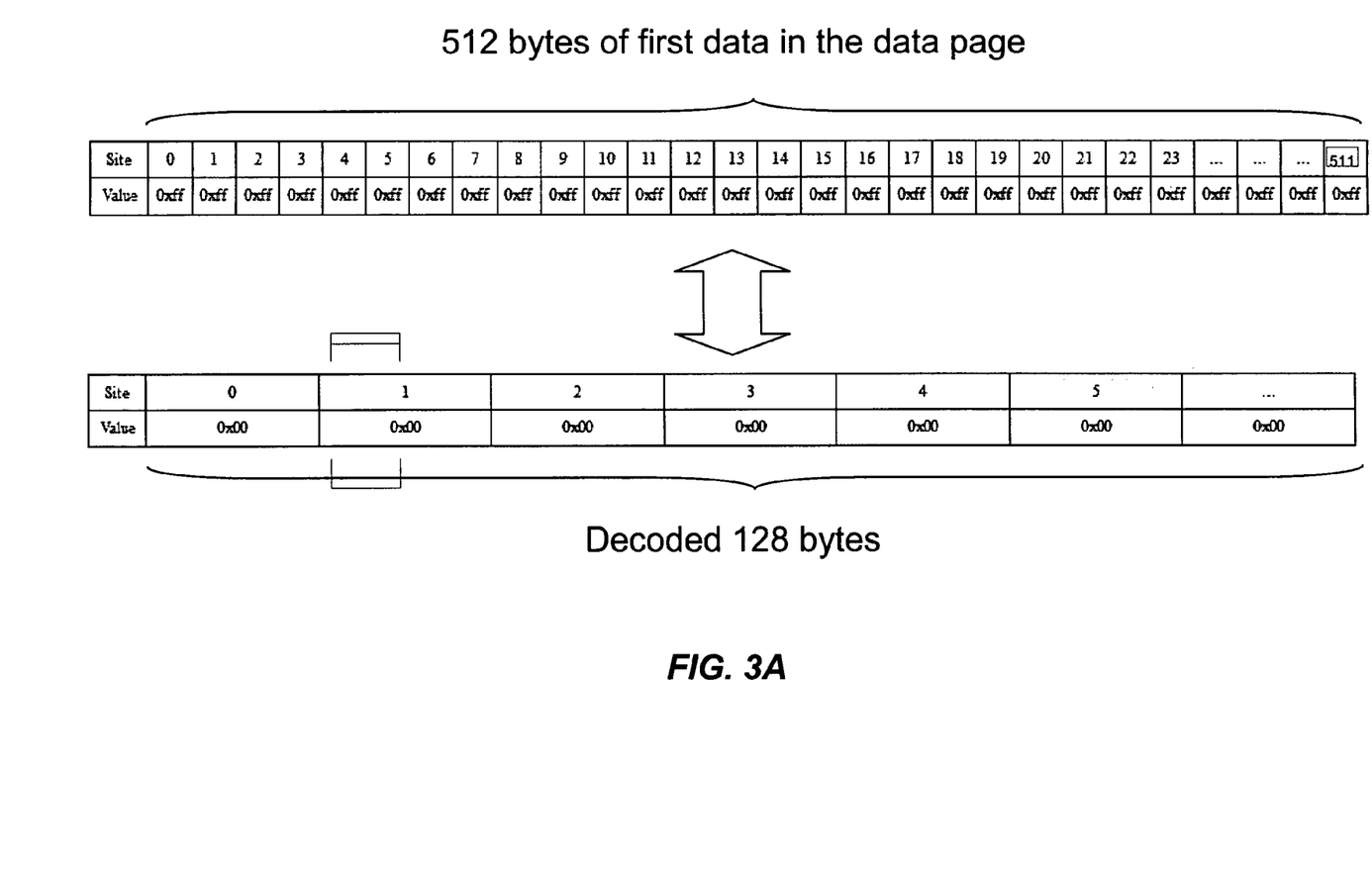
FIGS. 3A-3E illustrate an example of the programming method of the non-volatile memory for programming bit signals unidirectionally according to the first embodiment of the present invention.
Figure 3B:
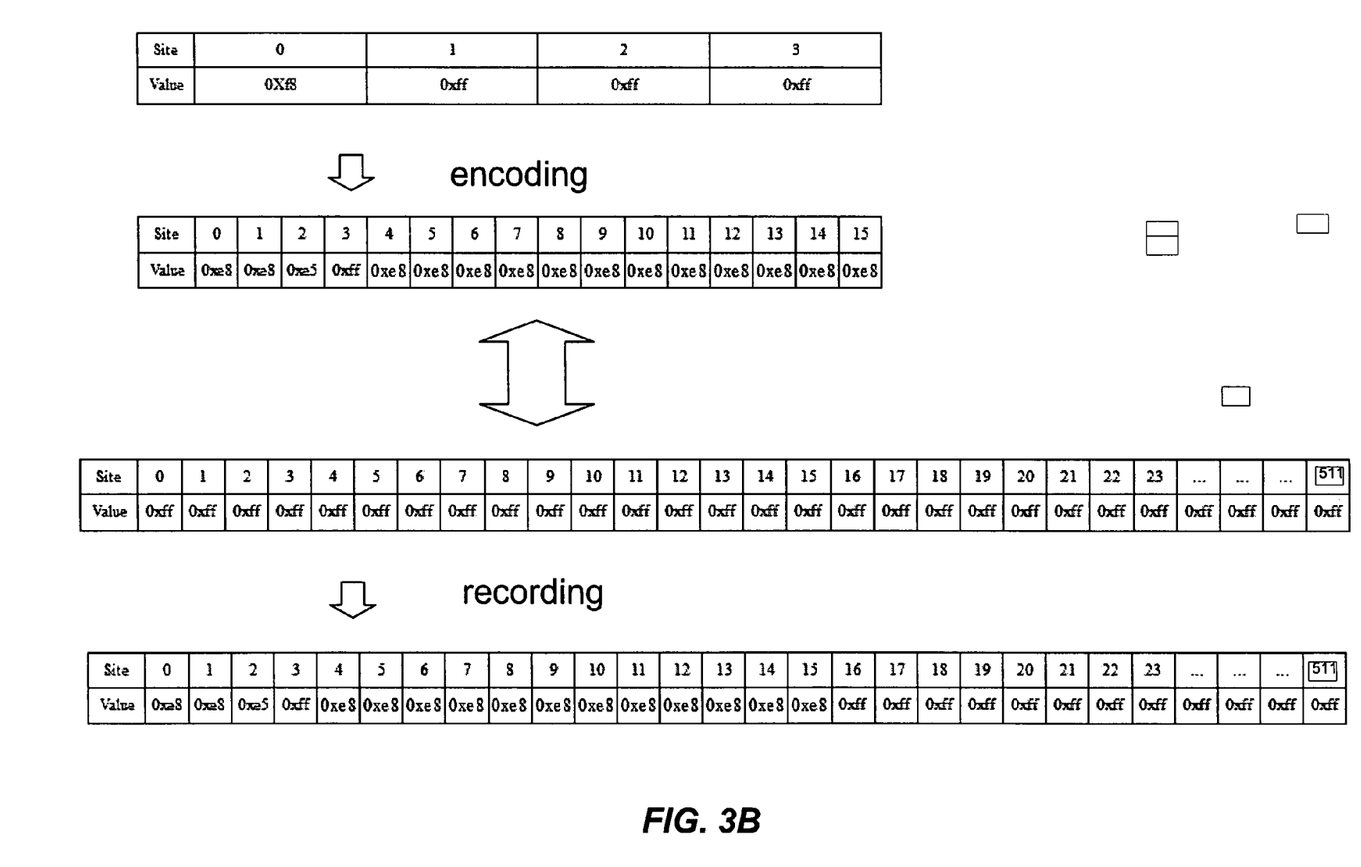

Please refer to FIG. 3A to FIG. 3E. As shown in FIG. 3A, there is a data page having first data with byte of "0xff" in 0~511 bytes. After all bytes are decoded, this data page includes 128 decoded bytes "0x00" and the first byte "0x00" indicates a location for data recording.

Figure 3C:
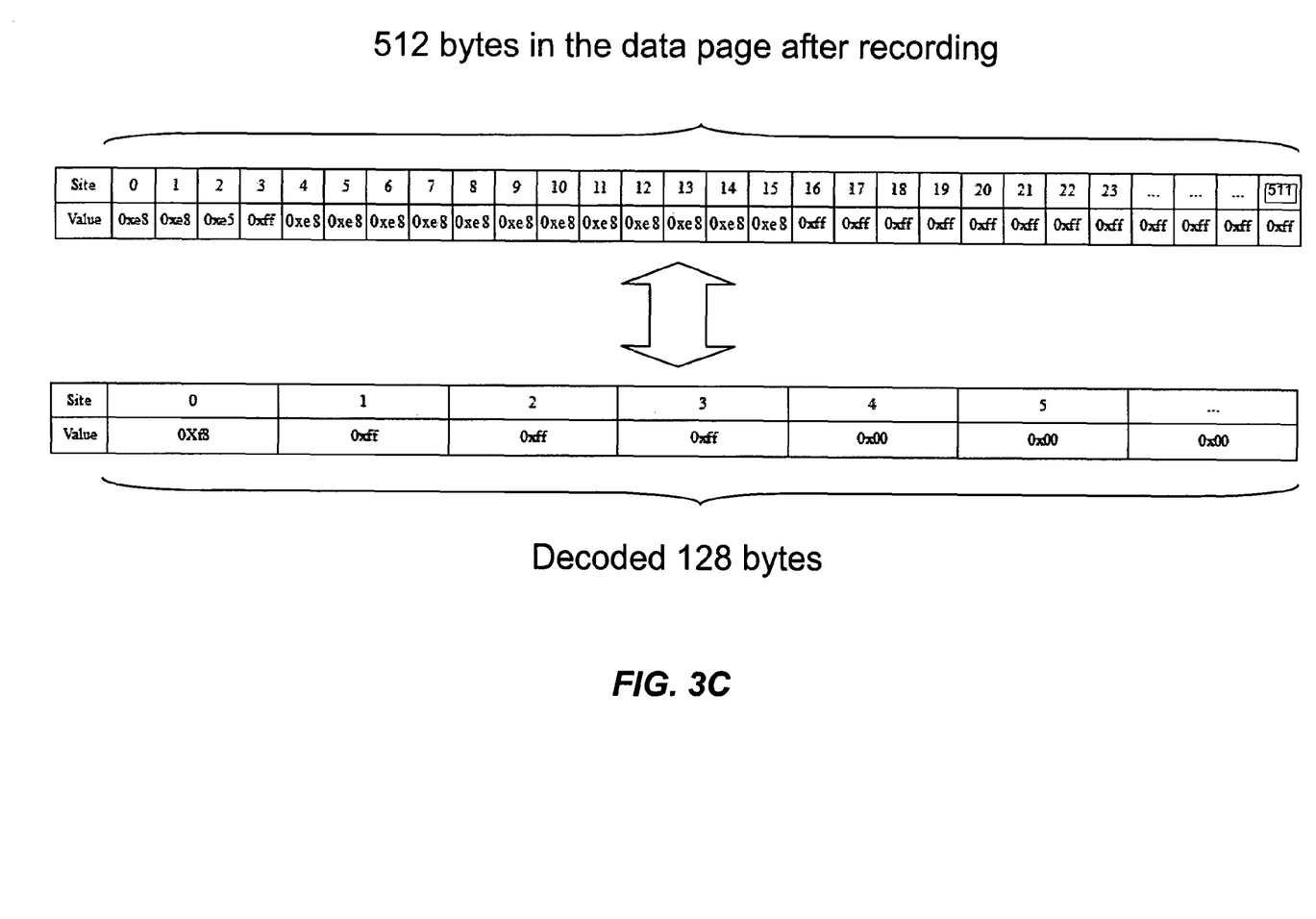

If the third data of sites 0~3 are "0xf8", "0xff", "0xff", and "0xff" and saved to the data page after encoding, the second data of sites 0~15 will be "0xe8", "0xe8", "0xe5", "0xff", "0xe8", "0xe8", "0xe8", "0xe8", "0xe8", "0xe8", "0xe8", "0xe8", "0xe8", "0xe8", "0xe8", and "0xe8" and recorded to the data page starting from the location mentioned above, as shown in FIG. 3B. Here, sites 0~15 in the data page are used. Meanwhile, other sites in the data page are unchanged. After that, the data page of 0~511 bytes representative of 128 decoded bytes is programmed. As shown in FIG. 3C, updated 512 bytes in the data page are presented.

Figure 3D:
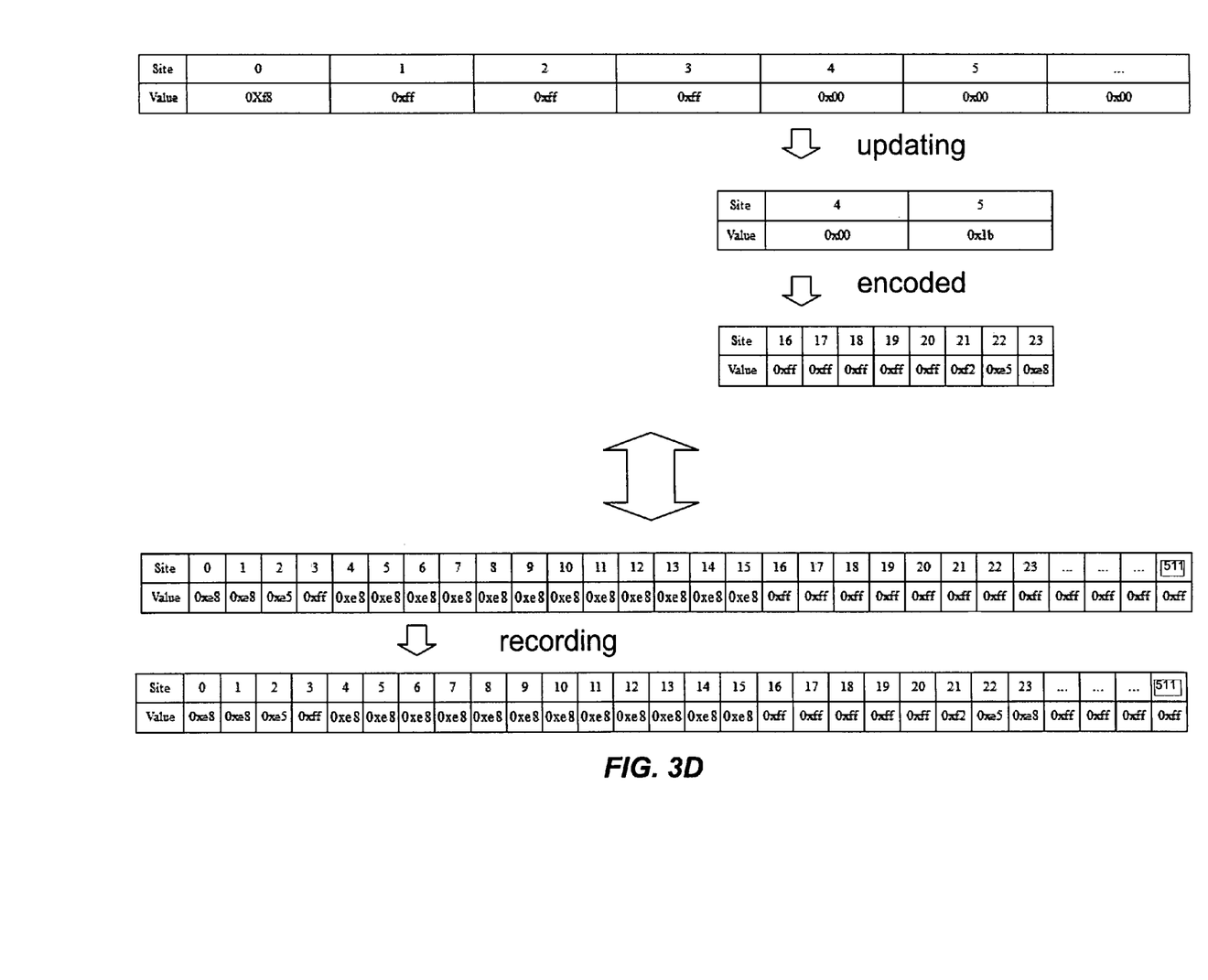
Figure 3E:
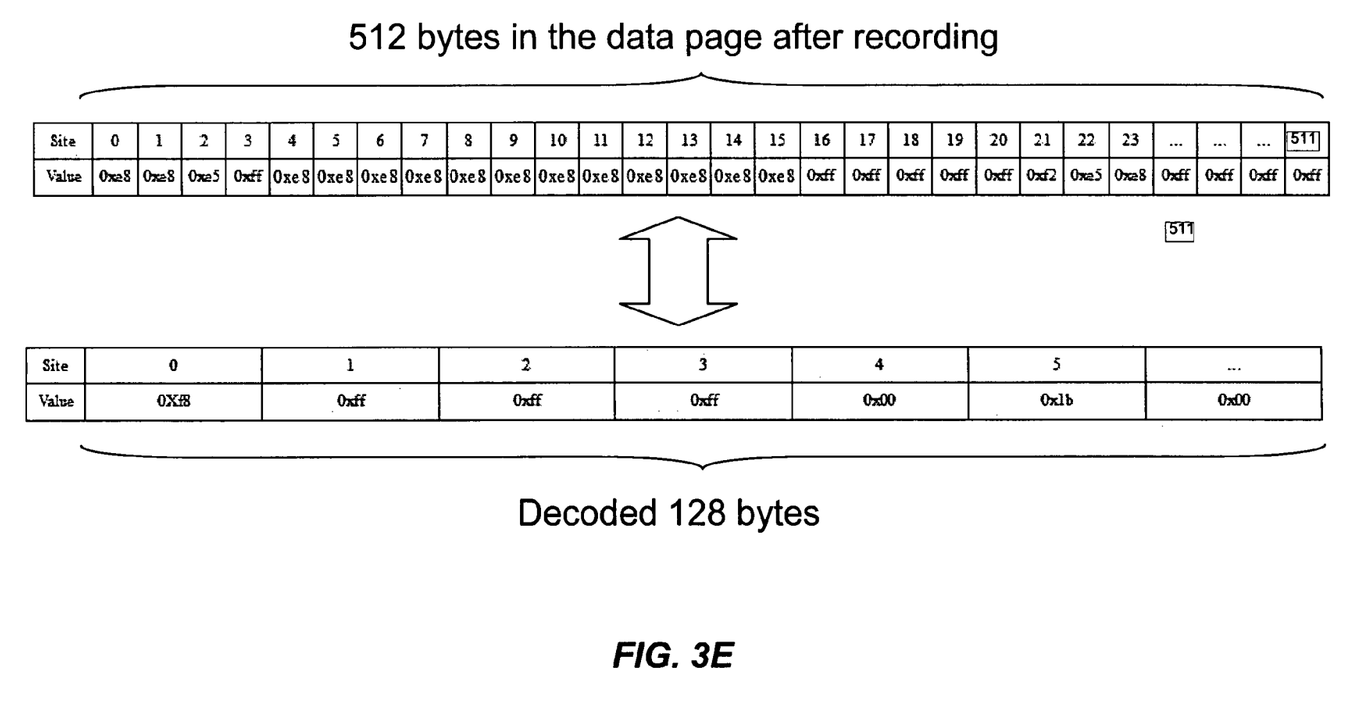

Furthermore, if the third data of sites 4~5 shown in FIG. 3D are updated as "0x00" and "0x1b", the second data will be read by the reading module 113. The encoding module 114 will encode bytes "0x00" and "0x1b" as bytes "0xff", "0xff", "0xff", "0xff", "0xff", "0xf2", "0xe5", and "0xe8" and save the latter to the data page. Then, bytes at sites 16~19 of the second data become "0xff", "0xff", "0xff", and "0xff" and bytes at sites 20~23 become "0xff", "0xf2", "0xe5", and "0xe8." Meanwhile, other sites than sites 16~23 are unchanged. Finally, the data page of 0~511 bytes representative of 128 decoded bytes is programmed without introducing a new page, as shown in FIG. 3E.

Figure 4:
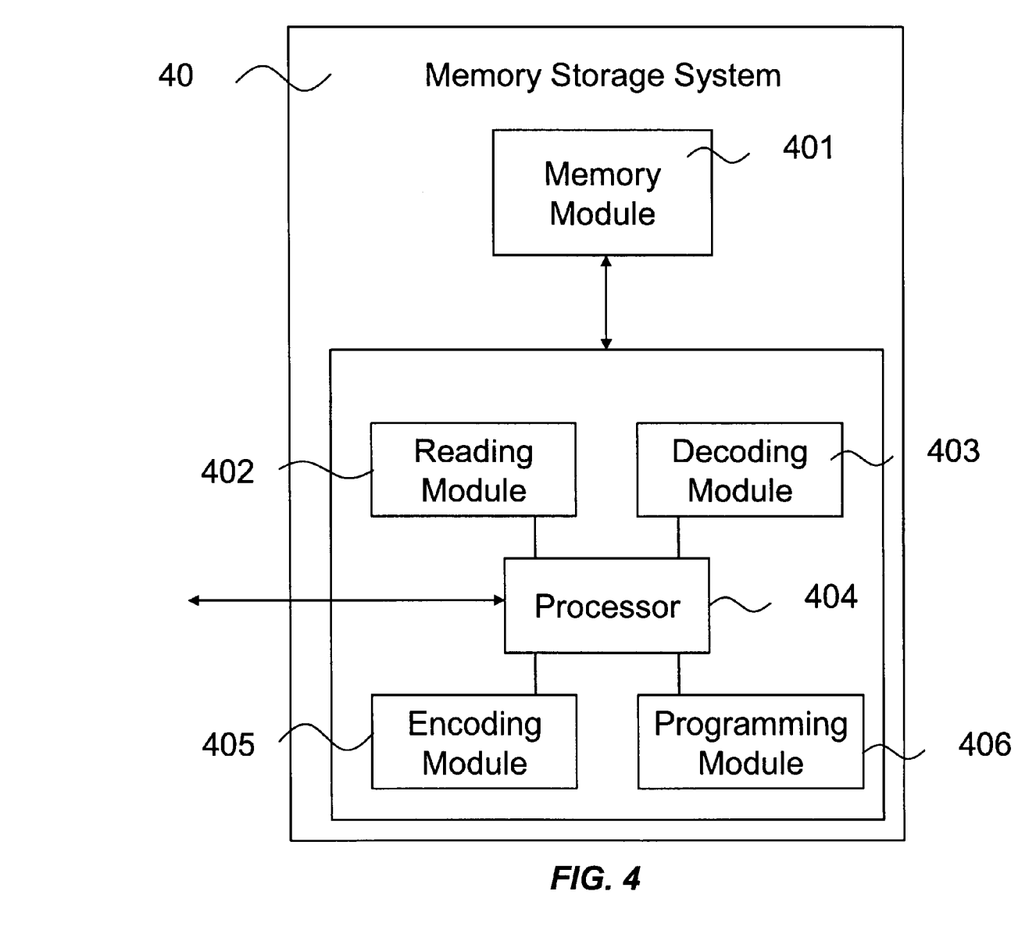
FIG. 4 is a non-volatile memory storage system for programming bit signals unidirectionally according to a second embodiment of the present invention.

Please refer to FIG. 4 which shows a second embodiment of the present invention, disclosing a memory storage system 40. This memory storage system 40 comprises a memory module 401, a reading module 402, a decoding module 403, a process 404, an encoding module 405 and a programming module 406. The memory module 401 is partitioned into a plurality of data pages (not shown) for storing data. The reading module 402 reads first data in the data page of memory module 401 and searches from the end of the data page for a sequence of bit "1" which represents continuous bytes of "0xff". Then, the decoding module 403 decodes 4 bytes of "0xff" in the sequence of bit "1" into a byte of "0x00".

For a third data with N bits to be written to the memory module 401, a processor 404 will receive the third data from a host and transfer the third data to an encoding module 405. The encoding module 405 will encode it into second data with (N+K) bits. Any two different data among the second data have a variance of M bits. Here N is defined to be a positive integer, K and M are both integers not less than 3, and M is less than (K+N). If any of the third data has N sequential bits of "0", the corresponding one of the second data has at least (N+3) sequential bits of "1". Error correction code (ECC) is provided to the second data. After the second data is generated from the encoding module 405, the processor 404 will transfer the second data to a programming module 406. The programming module 406 will record the second data into in data page from the location where byte "0x00" is decoded by the decoding module 402. If the third data need to be loaded from the memory module 401, the reading module 402 will find out the recorded second data. The decoding module 403 will decode the second data back to the third data. The following procedures are same as those in the previous embodiment, and the description thereof is omitted for brevity.

The present invention is applied to a non-volatile memory limited to programming bit signals unidirectionally. Preferably, the non-volatile memory can be One Time Program (OTP) flash memory, electrically erasable programmable read-only memory (EEPROM) or flash EEPROM limited to programming bit signals unidirectionally.

For this embodiment, the invention method is executed by a firmware saved in a ROM. The firmware can be updated for new version. In other embodiment, the invention method can be executed by a code stored by means of any recording apparatus connecting to the processor.

In conclusion, the present invention provides a non-volatile memory for programming bit signals unidirectionally and its programming method. An error correction code (ECC) is introduced for programming a data page, thereby preventing programming process from bit errors. The invention also decreases the utilization ratio of new pages to program updated data and saves spaces of entire memory.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A programming method for a non-volatile memory with a unidirectionally programmed bit signal, wherein the non-volatile memory includes a plurality of data pages, the programming method comprising:

programming a first data into a portion of a first data page which is one of the data pages of the non-volatile memory, wherein the first data comprising a first number of sequential bits of first status and the first number of sequential bits of the first status in the first data can decode into a second number of sequential bits of second status; and programming a second data into the other portion of the first data page wherein the second data is generated by encoding a third data which has N bits;

wherein the second data has (N+K) bits, and any two different data among the second data have a variance of M bits, where N is a positive integer, K and M are both integers not less than 3, and M is less than (K+N).

2. The programming method according to claim 1, wherein the second data include error correction code (ECC).

3. The programming method according to claim 1, further comprising: using a Hamming code for encoding the third data.

4. The programming method according to claim 1, wherein the unidirectionally programmed bit signal has a value of "0" or "1", and is programmed from "0" to "1" merely.

5. The programming method according to claim 1, wherein the unidirectionally programmed bit signal has a value of "0" or "1", and is programmed from "1" to "0" merely.

6. The programming method according to claim 1, wherein the non-volatile memory uses FAT file system.

7. The programming method according to claim 1, wherein the data page is re-programmable.

8. The programming method according to claim 1, wherein the non-volatile memory comprises an electrically erasable programmable read-only memory (EEPROM) or a flash memory.

9. The programming method according to claim 1, wherein the first status is "1", and the second status is "0".

10. The programming method according to claim 1, wherein the first status is "0", and the second status is "1".

11. The programming method according to claim 1, wherein the first number is bigger than the second number.

12. The programming method according to claim 1, wherein the first number of sequential bits of first status stands for a byte of "0xff" and the second number of sequential bits of second status stands for bits of "00" respectively.

13. A controller for a non-volatile memory with a unidirectionally programmed bit signal and partitioned into a plurality of data pages, the controller comprising:

a programming module for programming a first data into a portion of a first data page which is one of the data pages of the non-volatile memory, and programming a second data into the other portion of the first data page, wherein the first data comprising a first number of sequential bits of first status;

a decoding module for decoding the first number of sequential bits of the first status into a second number of sequential bits of second status; and an encoding module for encoding a third data which has N bits into the second data wherein the second data has (N+K) bits, and any two different data among the second data have a variance of M bits, where N is a positive integer, K and M are both integers not less than 3, and M is less than (K+N).

14. The controller according to claim 13, wherein the second data include error correction code (ECC).

15. The controller according to claim 13, wherein the encoding module uses a Hamming code for encoding the third data.

16. The controller according to claim 13, wherein the unidirectionally programmed bit signal has a value of "0" or "1", and is programmed from "0" to "1" merely.

17. The controller according to claim 13, wherein the unidirectionally programmed bit signal has a value of "0" or "1", and is programmed from "1" to "0" merely.

18. The controller according to claim 13, wherein the non-volatile memory uses FAT file system.

19. The controller according to claim 13, wherein the data page is re-programmable.

20. The controller according to claim 13, wherein the non-volatile memory comprises an electrically erasable programmable read-only memory (EEPROM) or a flash memory.

21. A non-volatile memory system with a unidirectionally programmed bit signal, comprising:

a memory module partitioned into a plurality of data pages for storing data;

a programming module for programming a first data into a portion of a first data page which is one of the data pages of the memory module, and programming a second data into the other portion of the first data page and encoding a third data which has N bits into the second data, wherein the first data comprising a first number of sequential bits of first status; and a decoding module for decoding the first number of sequential bits of the first status into a second number of sequential bits of second status;

wherein the second data has (N+K) bits, and any two different data among the second data have a variance of M bits, where N is a positive integer, K and M are both integers not less than 3, and M is less than (K+N).

* * * * *